Nov. 12, 1935. F. A. BASSETT 2,020,869
REEL FITTING
Filed Feb. 17, 1934 2 Sheets-Sheet 2

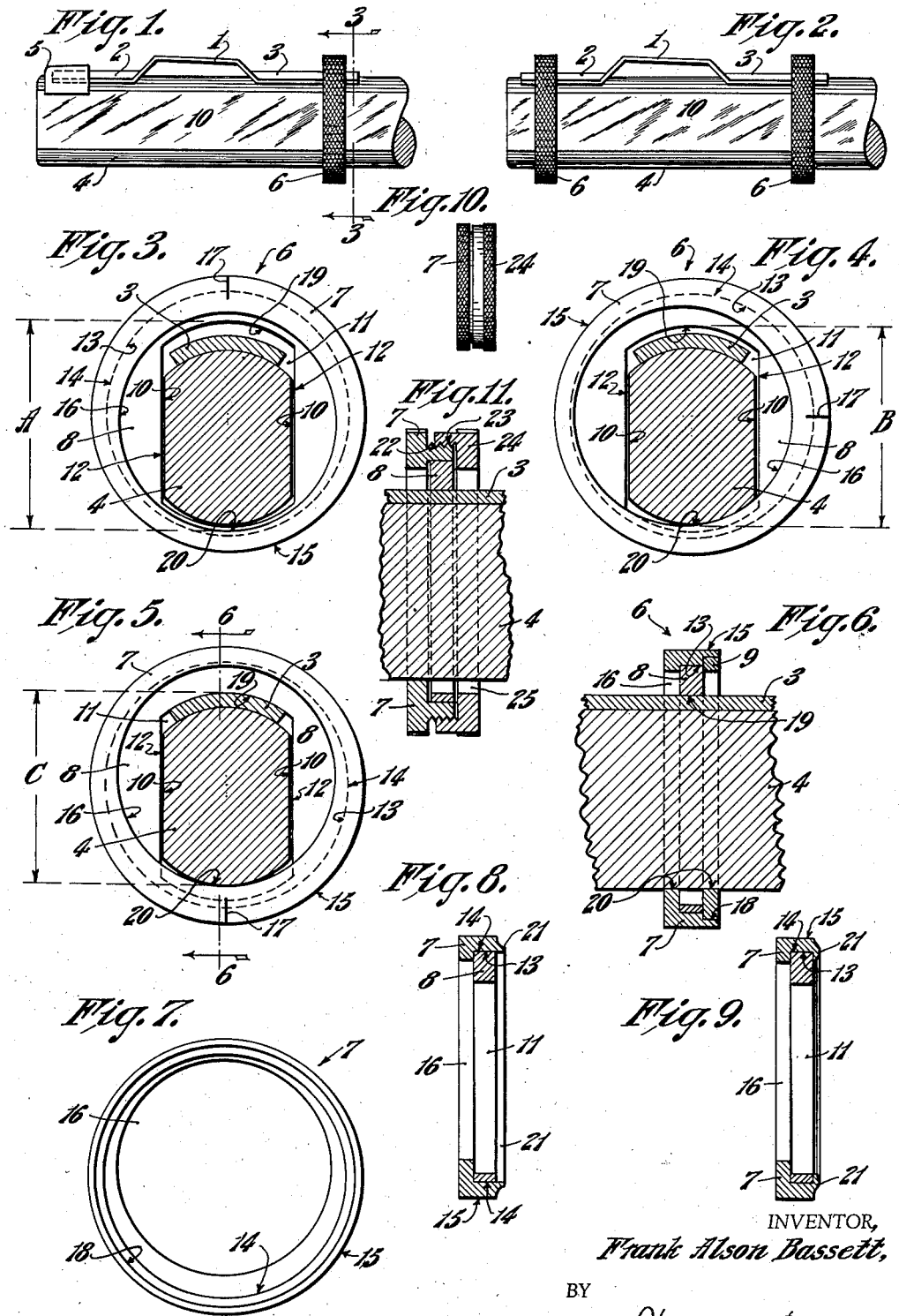
Nov. 12, 1935.  F. A. BASSETT  2,020,869
REEL FITTING
Filed Feb. 17, 1934  2 Sheets-Sheet 1
INVENTOR,
Frank Alson Bassett,
BY
Harry W. Bowen.
ATTORNEY.

INVENTOR,
Frank Alson Bassett,
BY
Harry W. Bowen
ATTORNEY.

Patented Nov. 12, 1935

2,020,869

UNITED STATES PATENT OFFICE 2,020,869

REEL FITTING

Frank Alson Bassett, Holyoke, Mass.

Application February 17, 1934, Serial No. 711,681

2 Claims. (Cl. 43—22)

My invention relates to improvements in reel fittings, and more particularly to that part of the reel fitting intended for use as a lock or retaining means, for securing the reel plate to a casting or fishing rod.

This application relates to the type of reel fittings, shown and described in my prior Patent Number 1,970,641, dated August 21, 1934, on an application filed April 15, 1933, Serial Number 666,317.

An object of my invention is to provide a locking device for reel fittings, which is simple and economical in construction, which may be easily and quickly manipulated to engage or disengage the reel plate on the butt of a casting or other fishing rod, and which is, at the same time, positive and efficient in operation.

These and other objects and advantages of my invention will be more particularly set forth and described in the specification, the accompanying drawings, and the appended claims.

Broadly considered, my invention comprises a ring member formed with an opening and having the axis of its outer peripheral surface eccentrically disposed relative to the axis of the opening, a second ring member formed with an opening and having the axis of its outer peripheral surface eccentrically disposed relative to the axis of its opening, means for preventing rotation of the second ring member when the same is slidably secured on the butt and reel plate of a fishing rod or the like, and operative connecting means between the two rings, whereby, when the first ring is rotated, the diametrical distance between any point on the periphery of the opening in the first ring, and any point on the periphery of the opening in the second ring will be increased or decreased.

A preferred embodiment of my invention, with modifications of that embodiment, is illustrated in the accompanying drawings, in which:—

Fig. 1 is a partial elevational view of the butt of a casting or fishing rod, illustrating the locking device holding a reel plate on the butt.

Fig. 2 is a view, similar to Fig. 1, illustrating the use of a second locking device in place of the usual socket.

Fig. 3 is a cross sectional view on the line 3—3 of Fig. 1, showing the ring members in unlocked position relative to the rod and reel plate.

Fig. 4 is a view similar to Fig. 3, showing the ring members, as they appear halfway between fully opened and maximum closed position.

Fig. 5 is a view similar to Fig. 3, showing the ring members in locking position.

Fig. 6 is a sectional view on the line 6—6 of Fig. 5.

Fig. 7 is an elevational view of the revolvable, or outer, ring member.

Fig. 8 is a sectional view similar to Fig. 6, illustrating a modified form of outer ring member having a lip portion.

Fig. 9 is a view similar to Fig. 8, showing the lip portion spun over to hold the inner ring member in place.

Fig. 10 is an elevational view of a modified form of locking device.

Fig. 11 is a sectional view of the device shown in Fig. 10.

Referring now to the drawings in detail, in which like numerals refer to like parts throughout:

Figure 12:
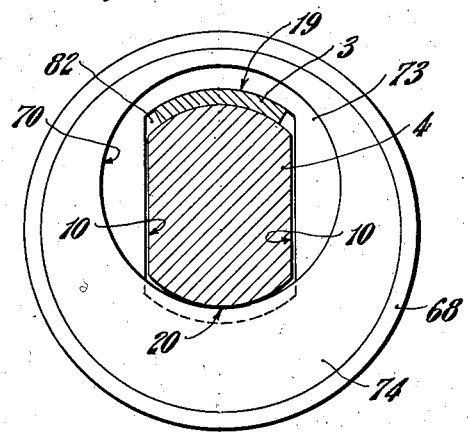
Fig. 12 is a view similar to Fig. 5, illustrating a modified form of locking device utilizing a worm and gear.

I will first describe the device illustrated in Figs. 1-7, inclusive. A reel plate 1, having end portions 2 and 3, is secured or locked on a butt 4 of a rod (not shown) by inserting the end 2 in a socket 5, formed or secured on the butt 4, and by a locking device 6 slipped over the butt 4 and end 3 and locking in place, as shown in Fig. 1, or by a locking device 6 over both ends 2 and 3, as indicated in Fig. 2. The locking device 6 comprises a revolvable ring member 7, an inner, non-revolving ring member 8, and a retaining ring 9. The butt 4 is formed with flat sides 10, and the inner ring member 8 is formed with an opening 11 having parallel straight sides 12, conforming to the flat sides 10 of the butt 4, thereby preventing the ring 8 from revolving on the butt 4. The axis of the opening 11 is eccentrically disposed, relative to the axis of the outer peripheral surface 13 of the ring 8. The outer, or revolvable ring member 7 is formed with a bearing surface 14 concentric with an outer peripheral knurled surface 15, which rides on the outer peripheral surface 13 of the inner ring 8. The outer ring member 7 is also formed with an opening 16, whose axis is eccentrically disposed relative to the axis of the bearing surface 14 and the axis of the outer surface 13 of the inner ring member 8. The ring member 7 is marked at 17 to indicate to a user the relative positions of the inner and outer rings. A retaining ring member 9 is pressed, or otherwise secured, in a rabbet 18, formed in the outer ring member 7, to hold the inner ring member 8 in place.

In operation, the locking device 6, with the ring members 7 and 8 in the relative positions indicated in Fig. 3, is slipped over the end 3 of the reel plate 1. In this position, the diametrical distance A between the edge 19 of the inner ring 8 and the edge 20 of the outer ring 7, is sufficient to provide free movement of the device 6 on the butt 4 and reel plate 1. After the device 6 has been slipped over the end 3 of the reel plate 1, the outer ring 7 is turned in either direction. In Fig. 4, the outer ring 7 is shown as being turned approximately 90 degrees from the position indicated in Fig. 3. In the position shown in Fig. 4, the distance B is materially less than the distance A, and engagement of the edge 20 on the under side of the butt 4 has raised the butt 4 in the opening 11. In Fig. 5, the outer ring 7 is shown as being turned approximately 180 degrees from the position indicated in Fig. 3, and the distance C is sufficiently less than the distance A, to firmly grip and lock together the butt 4 and end 3 of the reel plate 1 between the edges 19 and 20.

Figs. 8–11, inclusive, illustrate modified means for assembling the rings 7 and 8. In Figs. 8 and 9, the outer ring 7 is formed with a relatively thin web or flange portion 21, which is spun, or crimped over as indicated in Fig. 9, to hold the inner ring 8 in place. In Figs. 10 and 11, the outer ring 7 is formed with threads 22, which engage threads 23 formed on a locking nut or ring 24. This construction permits the two rings 7 and 8 to be locked together by the ring 24, after they have been set to hold the reel plate and rod butt. The locking nut 24 is formed with an opening 25, sufficiently large so that it will clear the butt and reel plate at all times, regardless of the relative positions of the rings 7 and 8.

Figure 14:
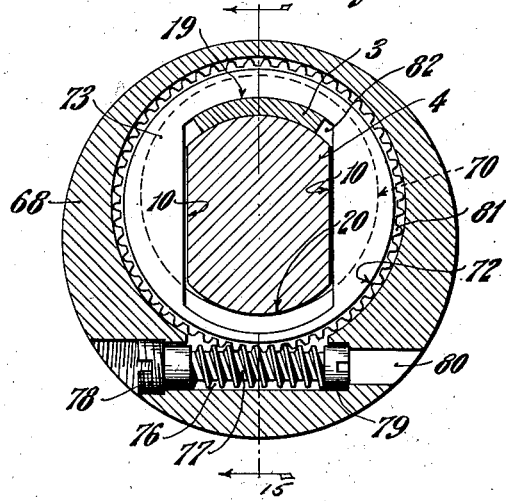
Fig. 14 is a cross sectional view on the line 14—14 of Fig. 13.
Figure 13:
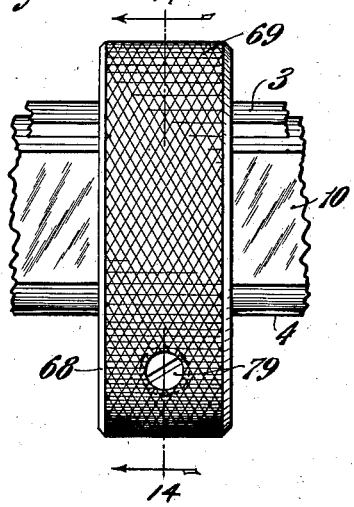
Fig. 13 is an elevational view of the device shown in Fig. 12.
Figure 15:
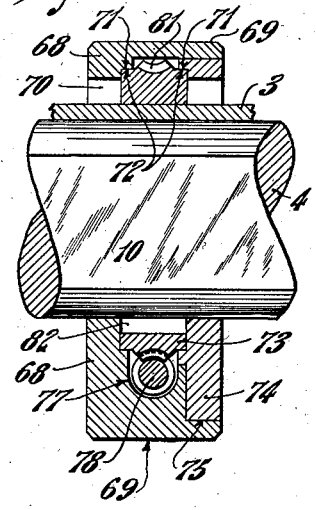
Fig. 15 is a sectional view on the line 15—15 of Fig. 13.

I have illustrated in Figs. 12–15, inclusive, a modified form of locking device, in which positive locking means is provided in the use of a worm and gear for revolving the outer locking ring on the inner locking ring. The revolvable ring member 68, having the outer knurled surface 69, is formed with the opening 70, eccentrically disposed relative to the surface 69 and the bearing surfaces 71 which ride on the bearing surfaces 72 of an inner ring member 73. A ring member 74, secured in a rabbet 75, formed in the outer ring member 68, retains the inner ring member 73 within the member 68. The member 68 is also formed with an opening 76, in which is revolvably secured a worm 77, held in place by a plug 78. The worm 77 is revolved by means of the slotted head portion 79, accessible through the opening 80. The inner or non-revolvable ring 73 is formed with worm gear teeth 81, which are engaged by the worm 77, and an opening 82, which conforms, in general outline, to the rod butt 4 and end portion 3 of the reel plate 1. In operation, a screw driver, or similar instrument, is inserted in the opening 80 to engage the slotted head 79, and the worm is revolved to revolve the ring 68 around the ring 73, until the portion 3 is locked to the butt 4, between the points 19 and 20, as described for Fig. 5.

Whereas Figs. 3, 4, and 5 are illustrative of the operation of the locking rings, it will be understood by those skilled in the art that the reel plate may be locked to the rod butt at any point between the position shown in Fig. 3 and the position shown in Fig. 5, depending upon the relative thickness of the reel plate used.

What I claim is:

1. In combination, a reel plate member, a reel seat member, and outer and inner concentrically-disposed relatively rigid rings arranged for relative rotation and having axial openings therethrough for receiving said plate and seat members, said openings being formed to provide eccentrically-disposed clamping surfaces for engaging said plate and seat members, said seat member being provided with a flat surface, said inner ring having a part which forms a chord of its opening and is arranged to abut said flat surface of the seat member whereby rotation of said inner ring relative to said seat member is prevented and straight-line movements thereof transversely relative to the longitudinal axis of the seat member are facilitated, all adapted and arranged whereby as the outer ring is rotated relative to the inner ring with the said chordal part of the inner ring in engagement with said flat surface of the seat member, the inner ring is moved transversely to the axis of the seat member and the said clamping surfaces of the rings are brought into engagement with said members so that the said members are clamped together.

2. In combination, a reel plate member, a reel seat member, outer and inner concentrically-disposed relatively rigid rings arranged for relative rotation and having axial openings therethrough for receiving said plate and seat members, said openings being formed to provide eccentrically-disposed clamping surfaces for engaging said plate and seat members, said seat member being provided with flat surfaces, said inner ring having parts which form chords of its opening and arranged to abut said flat surfaces of the seat member whereby rotation of said inner ring relative to said seat member is prevented and straight-line movements thereof transversely relative to the longitudinal axis of the seat member are facilitated, and means on the outer ring engaging the inner ring for moving the latter as the former rotates, all adapted and arranged whereby as the outer ring is rotated relative to the inner ring with the said chordal parts of the inner ring in engagement with said flat surfaces of the seat member, the inner ring is moved transversely to the axis of the seat member and the said clamping surfaces of the rings are brought into engagement with said members so that the said members are clamped together.

FRANK ALSON BASSETT.